United States Patent [19]
Bozsik

[11] 3,731,757

[45] May 8, 1973

[54] STEERING MECHANISMS
[76] Inventor: Mihaly Bozsik, P. O. Box 47, R. R. No. 5, Hamilton, Ontario, Canada
[22] Filed: Apr. 6, 1971
[21] Appl. No.: 131,752

[52] U.S. Cl..............180/6.26, 115/1 R, 115/12 A, 180/5 R, 180/53 R
[51] Int. Cl. ............................................B62d 11/08
[58] Field of Search..................180/5 R, 6.24, 6.26, 180/6.32, 53 R; 115/1 R, 12 R, 12 A

[56] References Cited

UNITED STATES PATENTS

| | | | |
|---|---|---|---|
| 3,464,510 | 9/1969 | Washizawa et al. | 180/6.26 X |
| 3,194,205 | 7/1965 | Mattson et al. | 115/12 R |
| 3,444,837 | 5/1969 | Donofrio | 115/1 R |
| 2,743,698 | 5/1956 | Leonard et al. | 115/12 A X |
| 3,397,538 | 8/1968 | Then et al. | 115/12 R X |
| 3,602,321 | 8/1971 | Kortschaga | 180/53 R X |

FOREIGN PATENTS OR APPLICATIONS

| | | | |
|---|---|---|---|
| 1,341,654 | 9/1963 | France | 115/12 R |
| 881,621 | 1/1943 | France | 180/6.32 |

Primary Examiner—Kenneth H. Betts
Assistant Examiner—Leslie J. Paperner
Attorney—Church and Rogers

[57] ABSTRACT

A steering mechanism for an all-terrain vehicle has an auxiliary steerable member connected to the steering member for control of another steerable terrain-engaging member such as a ski or water jet pump mounted thereon. The auxiliary steerable member includes a power-output shaft driven from the engine and driving the impeller of the jet pump unit. This auxiliary power output shaft can also be used to drive power devices mounted on the vehicle such as a snowblower or grass-cutter.

1 Claim, 7 Drawing Figures

INVENTOR.
MIHALY BOZSIK

Patented May 8, 1973 3,731,757

INVENTOR.
MIHALY BOZSIK
BY Church & Rogers
PATENT AGENTS

Patented May 8, 1973

INVENTOR.
MIHALY BOZSIK

BY *Church & Rogers.*

PATENT AGENTS

3,731,757

STEERING MECHANISMS

FIELD OF THE INVENTION

The present invention is concerned with improvements in or relating to steering mechanisms for vehicles, and especially but not exclusively to steering mechanisms for vehicles of the so-called "all-terrain" type.

REVIEW OF THE PRIOR ART

There is a continuing and increasing interest in light, relatively-inexpensive, rugged vehicles that are suited to all kinds of rough terrain, such as is encountered off the normal roads in backwoods, brush and desert. Preferably such vehicles should be capable of operation on land and water, so as to qualify as an all-terrain vehicle, without requiring any substantial modification or adjustments immediately prior to its movement from water to land, and vice versa.

SUMMARY OF THE INVENTION

It is an object of the present invention to provide a new steering mechanism for vehicles.

It is a specific object to provide a new steering mechanism for vehicles of the type employing two spaced parallel endless tracks as the ground-engaging members thereof.

It is another specific object to provide a new steering mechanism for vehicles, wherein an auxiliary water jet pump unit for propelling the vehicle in water can be steered and operated from the same control as the ground-engaging members.

It is an alternative specific object to provide a new steering mechanism whereby an auxiliary steering member such as a ski can be operated from the same control as the propelling ground-engaging member.

It is a further object to provide a new steering mechanism operable to permit use of rotary power-driven tools with the vehicle.

It is a further object to provide such a steering mechanism which is particularly simple and rugged in construction, so as to be inexpensive to manufacture and also to be able to withstand the severe strains that are encountered with vehicles of this type.

In accordance with the present invention there is provided a steering mechanism for a vehicle comprising ground-engaging members such as endless tracks, wheels or skis, upon which the vehicle runs, the steering mechanism comprising a steering member, means mounting the steering member in the vehicle for movement by an operator of the vehicle, a steerable vehicle axle operatively connected with at least one ground-engaging member for steering of the vehicle via the axle, an operating linkage connecting the steering member and the steerable axle, another steerable axle, means mounting the said another axle in the vehicle, and another operating linkage connecting the steering member and the said another steerable axle.

The vehicle includes an engine with an output shaft, and preferably the said another steering axle has a power output shaft with a power driving connection between it and the engine output shaft.

DESCRIPTION OF THE DRAWINGS

A vehicle which is a particular, preferred embodiment of the invention will now be described, by way of example, with reference to the accompanying diagrammatic drawings wherein.

DESCRIPTION OF THE PREFERRED EMBODIMENTS

Figure 1:
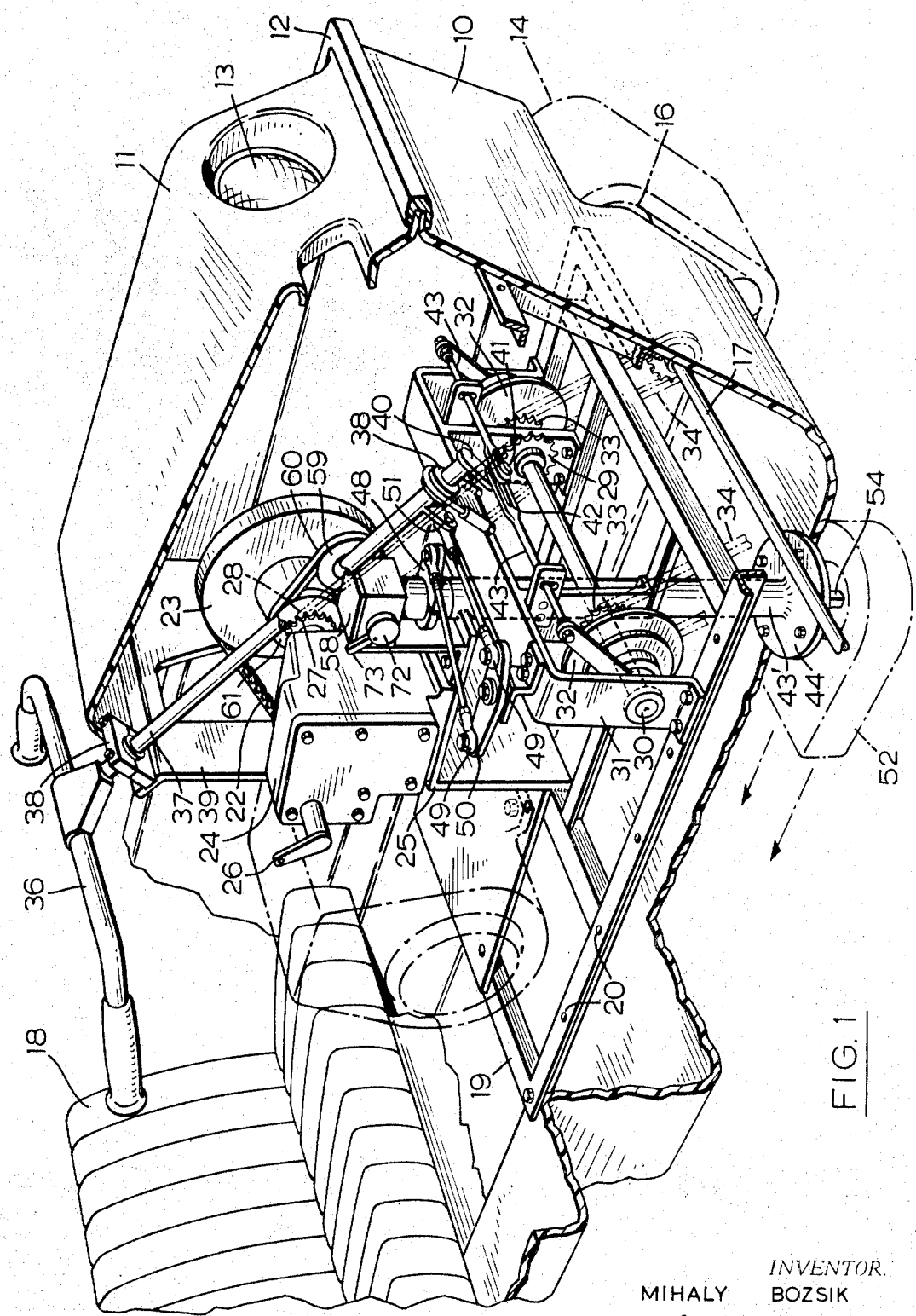
FIG. 1 is a perspective view of part of the vehicle, parts of the outer body being shown broken away as necessary in order for the steering mechanism to be seen as clearly as possible.

The vehicle body is indicated generally by the reference 10 and comprises a floatable hollow shell of generally boatlike form, usually made of a material such as polyester resin reinforced with glass fiber. The upper part 11 of the body provides a protective cowling in front, and a protective rubbing strip 12 is provided at the junction of the body parts. One or more headlights 13 will usually be provided. The lower portion of the body part 10 is shaped to constitute a downwardly-extending straight-sided well, thus providing side recess portions accommodating the ground-engaging members on which the vehicle runs.

Figure 6:
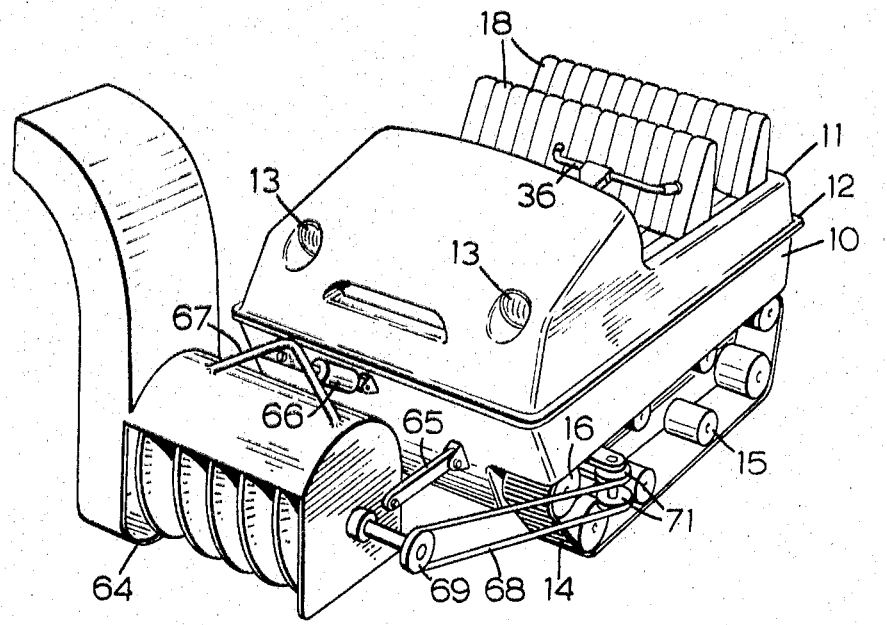
FIG. 6 is a perspective view of the entire vehicle, in order to show an arrangement for mounting a rotary power device, such as a snow-blower, to the front of the vehicle.

In this particular embodiment these ground-engaging members comprise a pair of endless tracks 14 mounted on supporting wheels such as 15 (FIG. 6). The frontmost upper pair of driving wheels 16 for the two tracks are each mounted on a respective shaft 17 (only one shown in FIG. 1), which is mounted in suitable bearings (not shown) in the side walls of the vehicle body. One or more seats 18 for the driver and the passenger or passengers are mounted towards the rear of the body straddling the said well.

The steering and driving mechanism for the vehicle comprises a strongly-braced rectangular framework 19 which is fastened by bolts such as 20 at its side edges to the corresponding horizontal wall of the vehicle body. This arrangement permits the entire steering and driving assembly to be removed from the vehicle as a unit upon removal of the fastening bolts 20.

The vehicle driving motor comprises a small gasoline engine 21 (shown in broken lines in FIG. 1) mounted on the framework 19. An engine power output pulley (not shown) is connected by a toothed belt 22 to a centrifugal clutch 23 mounted on the input shaft of a gear box 24. The gearbox is mounted on a bracket 25 fastened to the framework and is controlled by a lever 26 connected to a hand control (not shown) for the operator. An output shaft of the gearbox carried a sprocket 27 which is operatively connected by a chain 28 to another sprocket 29 carried by a shaft 30 which is mounted transverse to the length of the vehicle in a massive bracket 31 fastened to the framework. The driving power applied to the sprocket 29 is transmitted to the input shafts of combined brakes/clutches 32, and thence from the output shafts of these brakes/clutches through respective sprockets 33 and chains 34. Each chain 34 drives a sprocket 35 on the respective shaft 17, which drives the respective wheel 16 and track of the vehicle. The brakes/clutches 32 are of conventional form and no further description thereof is believed necessary for a full understanding of the present invention.

The steering member for the vehicle comprises a handle bar 36 having hand grips at each end thereof, the bar being fastened rigidly at its center to a steering shaft 37 which is mounted in bearings 38 carried by the bracket 31 and another bracket 39. The lower end of the shaft 37 carries a transverse arm 40 provided with a link pin 41, which is connected by respective lost-motion connections 42 to control rods 43, each of which rods controls a respective clutch/brake 32. Thus, as seen in FIG. 1, rotation of the handle bar to the left side of the vehicle will rotate the shaft 37 and move the pin 41 to the left. The respective lost motion connection 42 insures that the clutch/brake on the right side of the vehicle is not affected, while the other clutch/brake 32 is operated to decrease the power supplied to the left hand track, and to apply the brake thereto, so that the vehicle will turn to the left. A similar opposite action is obtained upon turning the handle bar in the opposite direction.

Figure 3:
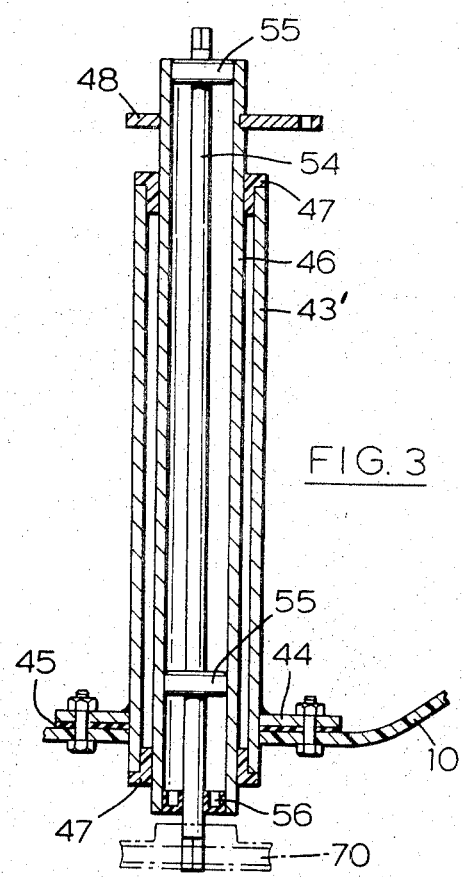
FIG. 3 is a longitudinal section, taken on the line 3—3 of FIG. 1, to show constructional details of another portion of the steering mechanism.
Figure 4:
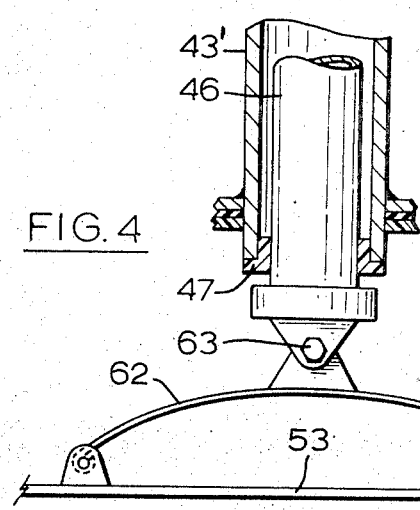
FIG. 4 is partially a side elevation and partially a cross-section to show an arrangement for mounting a steerable ski on the vehicle.
Figure 5:
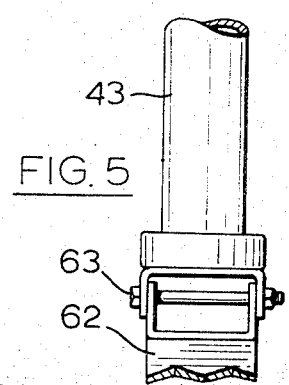
FIG. 5 is an end elevation of the arrangement shown in FIG. 4.

A tubular sleeve 43' has a circular flange 44 at its lower end which is fastened securely to the bottom of the body 10, a gasket 45 (FIG. 3) being interposed between the flange and the body to provide a water seal. The upper end of the tube is firmly mounted to the bracket 25. A tubular member 46 is rotatably mounted in the tube 43' by means of bushings 47 and is operatively connected to the steering shaft 37, and thence to the handle bar 36, by means of a clamp 48 embracing the shaft, connecting rods 49, an intervening lever 50 pivoted to the bracket 31 and an arm 57 extending radially from the steering shaft 37. Thus, as the shaft 37 is rotated the tubular member 46 will be rotated in the corresponding direction in the fixed tube 43', and any device fastened to the bottom end thereof, such as the steerable jet pump casing 52 shown in FIG. 1, or the ski 53 shown in FIGS. 4 and 5, will be steered in the corresponding directions. The upper end of the tubular member 46 is arranged to extend at least 6 inches above the normal water line of the vehicle, so that water cannot enter the vehicle by this route.

Figure 2:
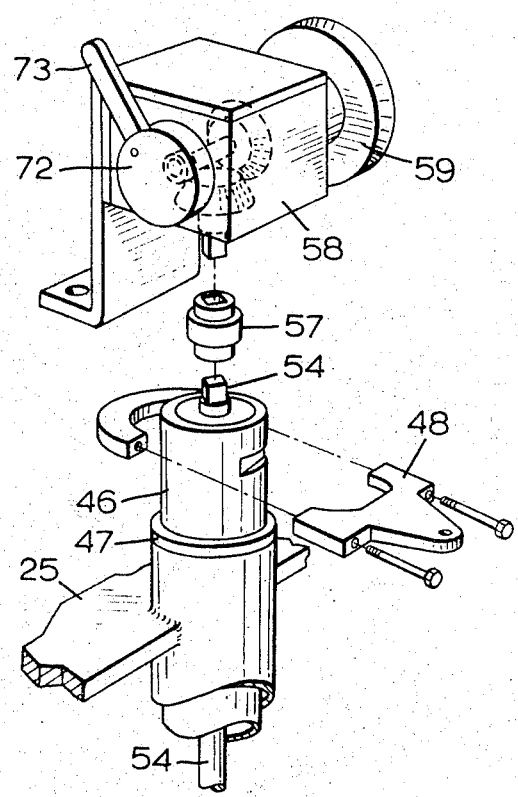
FIG. 2 is a detail view, partially exploded, to show a portion of the steering mechanism in greater detail.

A power output shaft 54 is mounted coaxially inside the member 46 by spaced ball-bearings 55, the lower end of the tube being provided with a waterseal 56 (FIG. 3), to prevent entry of water therein. The upper end of the shaft is connected by a coupling 57 (FIG. 2) to the output shaft of a right-angle drive 58, the input shaft of which is provided with a clutch 72 controlled by a lever 73 and carries a pulley 59 connected by drive belt 60 to a pulley 61 on the output shaft of the gearbox 24. Thus the shaft 54 can be supplied with power at will under control of the clutch 72 from the engine 21, and will in turn supply such power to any device which is mounted at its lower end.

Referring now especially to FIG. 1, this particular embodiment illustrated shows the application of the invention to the use of steerable tubular axle 46. The casing of the pump is connected to the lower end of the tube 46 and rotates therewith as the steering handle bar 36 is turned by the operator. The impeller (not shown) of the pump is operatively connected to the power output shaft 54 and, upon being driven thereby, expels a steered jet of water which not only propels the vehicle forward in the water, but can also be controlled by the handlebar to steer the vehicle.

It will now be seen that a completely all-terrain vehicle can be provided by this application of the invention, and the vehicle will operate on any terrain and can move from one type of terrain to another without requiring any preliminary operations for this purpose. Thus, the vehicle will run on solid and semi-solid grounds on its tracks and, upon entering the water, all that is necessary is to engage the power drive to the impeller of the steerable jet pump. In some embodiments, such modification may not even be required, and the impeller will be driven continuously; since it is operating only in air then the load upon the motor is negligible, and the pump becomes operative immediately upon being submerged in the water.

If the vehicle is to be used in snow conditions, all that is required is to mount a single central ski 53 upon the lower end of the shaft tube 46, at a height such that the front weight of the vehicle will be carried upon the ski, sufficient to enable it to provide the necessary steering. A spring 62 and a pivot 63 connect the ski to the tube. The ski is then steered by operation of the operator's control simultaneously with the operation of the track. Such an arrangement permits much more precise and satisfactory steering of the vehicle than a tracked vehicle which must rely solely upon the braking of the tracks.

Figure 7:
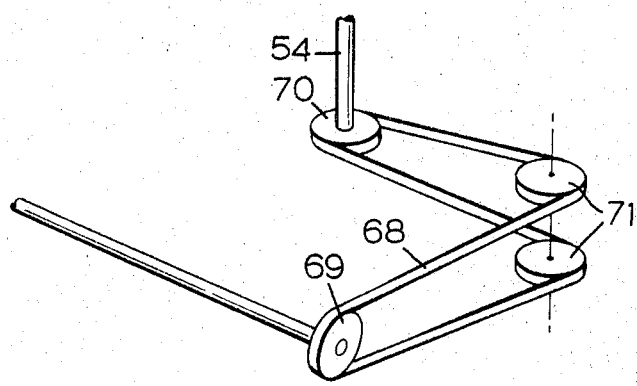
FIG. 7 is a schematic detail of the arrangement of FIG. 6.

FIG. 6 and 7 illustrate the way in which the invention may be applied to the mounting on the vehicle of any kind of rotary power driven machine such as a snow-blower, grass-cutter, lawn-sweeper, etc. For convenience a snow-blower 64 only is particularly illustrated, but the adaption of the support and drive for the snow-blower to other types of rotary machines will be apparent to those skilled in the art. The body of the snow-blower is connected to the body of the vehicle by means of two spaced pivoted links 65. A hydraulic cylinder 66, which may be controlled from a hand pump lever (not shown) inside the vehicle is connected between a bracket 67 fastened to the blower body and the vehicle body 10, so that the blower can be raised and lowered, In this particular embodiment the drive from the power shaft 54 is by means of a belt 68 which passes over power input pulley 69 of the blower, and is driven by a power output pulley 70 fastened for that purpose to the lower end of the drive shaft 54. The belt is presented in the proper orientation for driving the pulley 70 by means of vertically mounted idler pulleys 71.

Although the invention has been described as applied to a track-laying vehicle wherein the ground-engaging members are continuous tracks, it will be apparent that it is equally applicable to a wheeled vehicle wherein steering is accomplished by braking wheels mounted on the respective axles, or wherein steering is accomplished by turning movement of front wheels of the vehicle (or of skis) by a conventional steering mechanism. The invention is also applicable to any other type of vehicle in which a combination of different types of ground-engaging members is employed, for example, a combination of tracks to the rear of the vehicle with wheels or skis at the front.

Although in this particular embodiment the other or auxiliary steering axle is shown as mounted at the front end of the vehicle, in other embodiments it may be desired to mount the device toward the rear of the vehicle and to provide extended connecting links and driving connections thereto. However, the arrangement particularly illustrated does have the substantial advantage from the servicing point of view that, upon removal of the body cowling 11, and removal of the securing bolt 20, it is possible to lift the entire steering and driving assembly from the interior of the vehicle for ready servicing, or even replacement thereof.

The embodiments shown and described herein, are particular preferred examples of the way in which the invention is to be carried out, and modifications and changes therein will be apparent to those skilled in the art, within the scope of the appended claims.

What is claimed is:

1. In a vehicle comprising ground-engaging members upon which the vehicle runs, an assembly comprising a steering mechanism for the ground-engaging members and an auxiliary power-driven steerable member, the assembly comprising a removable framework mountably in the vehicle forwardly of a driver's position thereof, a steering member constituted by an inclined first shaft rotatably mounted to the framework for rotation about its longitudinal axis and extending rearwardly to the said driver's position for steering rotation by the driver, a pair of steering control clutches mounted by the framework and connected respectively to forward driven ground-engaging members of the vehicle for steering control thereof, an articulated linkage connecting the rotatable first shaft and the clutches for alternative operation thereof upon rotation of the shaft in respective alternative directions, another steering member constituted by a second hollow shaft rotatably mounted to the framework with its axis substantially vertical, and with its lower end extending below the vehicle between and adjacent said forward driven ground-engaging members, an articulated linkage connecting the first and second rotatable shafts for simultaneous corresponding rotations thereof about their respective axes, a clutch at the upper end of the second shaft, a power output shaft rotatably mounted within said second hollow shaft with its upper end in driving connection with the clutch member and its lower end carrying means for mounting an auxiliary power utilizing unit thereon, a motor mounted to the framework and having a power output shaft, and a power driving connection connecting the motor output shaft to the said pair of steering control clutches and to the said clutch on the second shaft.

* * * * *